US011305928B2

(12) United States Patent
Nishigaki et al.

(10) Patent No.: US 11,305,928 B2
(45) Date of Patent: Apr. 19, 2022

(54) PACKAGING BAG

(71) Applicant: TOPPAN PRINTING CO., LTD., Tokyo (JP)

(72) Inventors: Misao Nishigaki, Tokyo (JP); Eriko Nagata, Tokyo (JP)

(73) Assignee: TOPPAN PRINTING CO., LTD., Yokohama (JP)

( * ) Notice: Subject to any disclaimer, the term of this patent is extended or adjusted under 35 U.S.C. 154(b) by 0 days.

(21) Appl. No.: 16/015,304

(22) Filed: Jun. 22, 2018

(65) Prior Publication Data

US 2018/0297766 A1    Oct. 18, 2018

Related U.S. Application Data

(63) Continuation of application No. PCT/JP2016/088531, filed on Dec. 22, 2016.

(30) Foreign Application Priority Data

Dec. 24, 2015  (JP) .............................. JP2015-251990

(51) Int. Cl.
*B65D 81/02* (2006.01)
*B65D 81/03* (2006.01)
(Continued)

(52) U.S. Cl.
CPC .............. *B65D 81/022* (2013.01); *B32B 5/18* (2013.01); *B32B 27/065* (2013.01); *B32B 27/08* (2013.01);
(Continued)

(58) Field of Classification Search
CPC .... B65D 81/022; B65D 81/03; B65D 81/027; B65D 81/1275; B65D 81/127; B65D 75/5805; B65D 31/02; B65D 29/02
(Continued)

(56) References Cited

U.S. PATENT DOCUMENTS 3,055,575 A * 9/1962 Gerard ................... B65D 31/04
 383/206
4,087,002 A * 5/1978 Bambara ................ B29C 65/18
 206/523

(Continued)

FOREIGN PATENT DOCUMENTS

CN    1119847 A    4/1996
CN    2730771 Y   10/2005
(Continued)

OTHER PUBLICATIONS

Chinese Office Action dated Nov. 22, 2019 for corresponding Application No. 201680076061.3.
(Continued)

*Primary Examiner* — Robert Poon
(74) *Attorney, Agent, or Firm* — Foley & Lardner LLP

(57) ABSTRACT

A packaging bag is a packaging bag made of a laminate formed in a bag shape which is in a rectangular shape in plan view, the laminate being composed of a sheet-shaped substrate made of a resin, a cushioning material made of a foamed resin sheet laminated on an inner side relative to the substrate, and a sealant layer laminated on an inner side relative to the cushioning material. The packaging bag includes a seal section in which the sealant layers are sealed to each other on one end edge in a flow direction (MD direction) of the foamed resin sheet, the seal section extending in a direction perpendicular to the flow direction of the foamed resin sheet, wherein a notch is formed in the seal section to be oriented to the other end edge in the flow direction of the foamed resin sheet.

6 Claims, 7 Drawing Sheets

(51) Int. Cl.
  *B65D 75/58* (2006.01)
  *B32B 5/18* (2006.01)
  *B32B 27/06* (2006.01)
  *B32B 27/08* (2006.01)
  *B32B 27/20* (2006.01)
  *B32B 27/32* (2006.01)

(52) U.S. Cl.
  CPC .............. *B32B 27/20* (2013.01); *B32B 27/32* (2013.01); *B65D 75/5805* (2013.01); *B65D 75/5816* (2013.01); *B65D 81/027* (2013.01); *B65D 81/03* (2013.01); *B32B 2250/03* (2013.01); *B32B 2250/24* (2013.01); *B32B 2266/025* (2013.01); *B32B 2307/558* (2013.01); *B32B 2307/7265* (2013.01); *B32B 2439/46* (2013.01)

(58) Field of Classification Search
  USPC ........................................................ 206/523
  See application file for complete search history.

(56) References Cited

U.S. PATENT DOCUMENTS

| | | | | |
|---|---|---|---|---|
| 4,868,025 | A * | 9/1989 | Strzelewicz | B29C 65/18 428/35.2 |
| 5,328,053 | A | 7/1994 | Cook et al. | |
| 5,361,936 | A | 11/1994 | Cook | |
| 5,363,986 | A | 11/1994 | Cook | |
| 6,280,890 | B1 * | 8/2001 | Sawamura | G02B 5/201 349/106 |
| 8,202,001 | B1 * | 6/2012 | Zhang | B31B 70/00 383/37 |
| 2003/0129342 | A1 * | 7/2003 | Hara | B32B 29/00 428/36.91 |
| 2004/0000581 | A1 * | 1/2004 | Brandolini | B32B 27/08 229/68.1 |
| 2004/0265521 | A1 * | 12/2004 | Marzano | B32B 7/04 428/35.2 |
| 2005/0226542 | A1 * | 10/2005 | Kendall | B65D 27/14 383/207 |
| 2010/0278461 | A1 * | 11/2010 | Veiseh | B65D 81/03 383/107 |
| 2011/0099956 | A1 * | 5/2011 | Dunn | B65F 1/0006 53/567 |
| 2011/0236635 | A1 * | 9/2011 | Shimizu | B29C 55/023 428/141 |
| 2011/0303232 | A1 * | 12/2011 | Williams | B65B 29/00 131/359 |
| 2013/0196442 | A1 * | 8/2013 | Momose | B01L 3/50273 436/63 |
| 2015/0078686 | A1 * | 3/2015 | Hagino | B65D 31/02 383/116 |
| 2016/0176599 | A1 * | 6/2016 | Hanus | B65D 75/5805 383/209 |
| 2017/0225860 | A1 * | 8/2017 | van den Berg | B65D 75/008 |

FOREIGN PATENT DOCUMENTS

| | | |
|---|---|---|
| JP | S53-131967 U | 10/1978 |
| JP | 2002-059974 A | 2/2002 |
| JP | 2002-145277 A | 5/2002 |
| JP | 2003-192038 A | 7/2003 |
| JP | 2009-161217 A | 7/2009 |
| JP | 2010-241448 A | 10/2010 |

OTHER PUBLICATIONS

International Search Report with English language translation and Written Opinion issued in International Application No. PCT/JP2016/088531 dated Apr. 4, 2017.

* cited by examiner

PACKAGING BAG

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/088531, filed on Dec. 22, 2016, which is based upon and claims the benefit of priority to Japan Priority Application No. 2015-251990, filed on Dec. 24, 2015, the disclosures of which are all hereby incorporated herein by reference in their entireties.

TECHNICAL FIELD

The present invention relates to packaging bags.

BACKGROUND ART

As disclosed in PTLs 1 to 4, packaging bags having a cushioning function for protecting the contents from impact or the like are known in the logistics industry. As an example, PTL 1 discloses an envelope formed of kraft paper folded in half with the fold taken as the bottom of the envelope and both sides respectively adhered, and a plastic air bubble wrap sheet bonded to the inside of the envelope. PTL 2 discloses a cushion bag having an inner sheet made of a cushioning olefin resin and a paper sheet laminated on the inner sheet. PTL 3 discloses a small article bag having a high density polyethylene layer on the inner surface of a bag formed of a plastic foam sheet. PTL 4 discloses an envelope formed of two foamed resin plates, each of which has a resin film bonded to each of the front and back surfaces of the foamed resin plate. The foamed resin plates are stacked each other and adhered or fused to each other at the outer periphery.

CITATION LIST

Patent Literature

PTL 1: JP-2002-145277 A; PTL 2: JP-2002-59974 A; PTL 3: JP-2003-192038 A; PTL 4: JP-2009-161217 A

SUMMARY OF THE INVENTION

Technical Problem

The packaging bags having a cushioning function are made of a substrate and a cushioning material in order to appropriately protect the contents from water, impact, or the like. However, when the substrate is made of paper, the bags have reduced water resistance and the contents may be wet in some conditions. When a plastic foam sheet is used as a cushioning material, the contents may have indentations made by the bubbles of the plastic foam sheet. When the packaging bag includes a substrate made of paper and a cushioning material made of resin, disposal of the packaging bag is laborious since the substrate and the cushioning material, which are bonded to each other by an adhesive, are required to be disassembled for disposal.

On the other hand, when a substrate and a cushioning material are made of resin, the bag may have poor openability compared with packaging bags made of paper. In this case, a tear tape may be used to improve openability. However, this leads to an increase in the production cost. Alternatively, perforations extending in an opening direction may be formed at a position to be open. However, forming perforations penetrating through both the substrate and cushioning material may impair water resistance of the packaging bag.

An object of the present invention is to provide a packaging bag that appropriately protects the contents with improved openability and does not require laborious disassembly for disposal.

Solution to Problem

A packaging bag according to an aspect of the present invention is a packaging bag made of a laminate formed in a bag shape in a rectangular shape in plan view, the laminate being composed of a sheet-shaped substrate made of a resin, a cushioning material made of a foamed resin sheet laminated on an inner side relative to the substrate, and a sealant layer laminated on an inner side relative to the cushioning material. The packaging bag includes a first seal section in which the sealant layers are sealed to each other on at least one end edge in a flow direction of the foamed resin sheet, the first seal section extending in a direction perpendicular to the flow direction of the foamed resin sheet, wherein a start point of cutting is formed in the first seal section to be oriented to the other end edge in the flow direction of the foamed resin sheet.

According to the above packaging bag, disassembly for disposal can be reduced since a paper member is not used, and water resistance can be improved. Further, the foamed resin sheet has a flow direction (MD direction) of the resin due to the production processes, and has a characteristic of being easily torn in the MD direction. In the above aspect of the present invention, since the start point of cutting is formed to be oriented from one end edge to the other end edge in the flow direction of the foamed resin sheet, it guides a user to open the packaging bag from the start point of cutting in the flow direction, which improves openability. Further, a surface of the foamed resin sheet is often formed of a predetermined rough surface, and predetermined irregularities are also often formed on an inner surface (sealant layer) of the packaging bag. In this case, since the contents are less likely to move in the packaging bag, the contents can be held in a stable manner.

As one form of the aforementioned packaging bag, the packaging bag may further include a second seal section in which the sealant layers are sealed to each other on a side edge of the packaging bag, the second seal section extending in the flow direction of the foamed resin sheet and partially overlapping the first seal section, wherein the start point of cutting may be formed in an overlapped portion where the first seal section overlaps the second seal section. Since the laminate is made of resin, the second seal section in which the laminate is sealed is hardened compared with the other portions. The start point of cutting is formed at the overlapped portion where the first seal section and the second seal section overlap each other. This guides a user to open the packaging bag from the start point of cutting in the flow direction along the hardened second seal section.

As another form of the aforementioned packaging bag, the start point of cutting formed in the first seal section may include a plurality of notches formed in a continuous waveform shape. Since a plurality of notches is formed as the start point of cutting, a user can open the packaging bag from a desired position.

As still another form of the aforementioned packaging bag, the packaging bag may further include a third seal section which partially overlaps the first seal section, the third seal section being formed in a right triangle in plan view which includes one side edge of the first seal section extending in a direction perpendicular to the flow direction of the foamed resin sheet, wherein the start point of cutting may be formed in an overlapped portion where the first seal section overlaps the third seal section. When the start point of cutting is formed at the overlapped portion where the first seal section and the second seal section overlap each other, it guides a user to pinch the third seal section for opening the packaging bag. The third seal section, which is a right triangular shape, is formed to have a width partially larger than the first seal section in the flow direction of the foamed resin sheet. Accordingly, a user can pinch the third seal section with ease, which contributes to improvement in openability.

In any of the above forms of the aforementioned packaging bag, an expansion ratio of the foamed resin sheet may be in the range of 18 to 50 times, or alternatively, may be in the range of 18 to 32 times. When the expansion ratio of the foamed resin sheet, which is a cushioning material, is in the range of 18 to 50 times, the packaging bag having high openability, sealability and flexibility can be obtained. Further, when the expansion ratio of the foamed resin sheet, which is a cushioning material, is in the range of 18 to 32 times, the packaging bag having high puncture strength and processability as well as the openability and the like can be obtained.

In any of the above forms of the aforementioned packaging bag, the sealant layer may include a colored pigment. In this case, the colored pigment contained in the sealant layer may be in the range of 1 to 10 wt. %, or alternatively, may be in the range of 3 to 5 wt. %. Due to the colored pigment contained in the sealant layer, the contents in the packaging bag can be prevented from being readily recognized from the outside. When the colored pigment contained in the sealant layer is in the range of 3 to 5 wt. %, sealing strength similar to that of an uncolored sealant layer and improved concealability can be obtained.

In any of the above forms of the aforementioned packaging bag, the sealant layer may have a static friction coefficient and a kinetic friction coefficient in the range of 0.18 to 0.5. Further, the sealant layer may be substantially made of LLDPE. In this case, the slipperiness of the sealant layer located on the inner surface of the packaging bag can be reduced. Accordingly, when packaging of contents is performed by an automated packaging machine, the contents becomes less likely to be displaced, which facilitates automated packaging. Moreover, irregularities may be formed on an inner surface of the sealant layer. In this case, in addition to displacement during packaging, displacement in transporting the packaging bag in which the contents are accommodated can be reduced.

In any of the above forms of the aforementioned packaging bag, the thickness of the cushioning material may be in the range of 1 to 5 mm. In this case, a decrease in the volume ratio of the capacity to the outer volume of the packaging bag can be prevented while the cushioning function of the packaging bag is maintained. In this regard, the packaging bag is preferably formed in a pillow shape. However, the packaging bag may be formed in any other shape.

Desired Effects of Invention

According to a packaging bag of the present invention, openability can be improved while the contents being appropriately protected, and disassembly for disposal can be less laborious.

DESCRIPTION OF REPRESENTATIVE EMBODIMENTS

With reference to the drawings, embodiments of the present invention will be described in detail. For the purpose of convenience, substantially the same elements are denoted by the same reference numbers, and the description thereof may be omitted. In the following description, the thicknesses of the layers constituting a laminate are described based on the thicknesses after lamination. It is to be understood that these embodiments are intended to be representative of the present invention. It is not intended that the present invention is necessarily limited to the present invention.

First Embodiment

Figure 1:
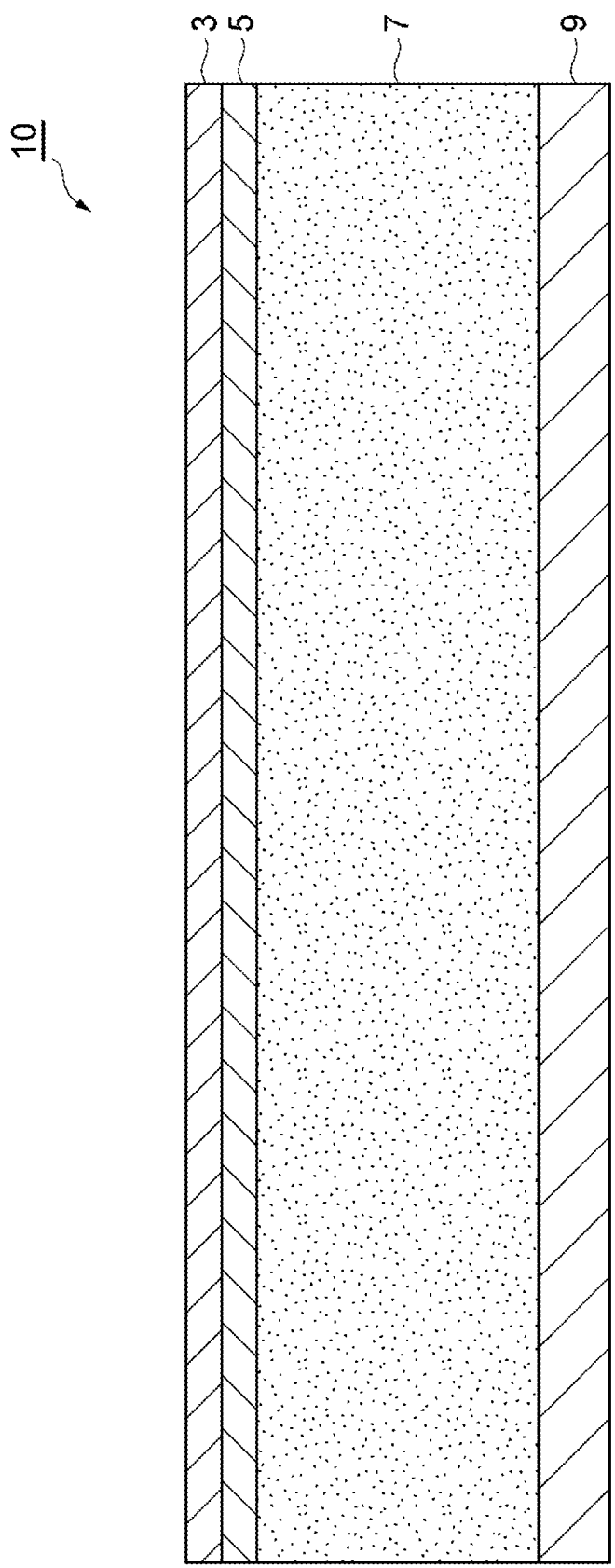
FIG. 1 is a schematic cross-sectional view that illustrates a structure of a laminate constituting a packaging bag according to an embodiment of the present invention.

FIG. 1 is a schematic cross-sectional view that illustrates a structure of a laminate 10 constituting a packaging bag 1 according to the present embodiment. The laminate 10 includes a sheet-shaped substrate 3 made of resin, a cushioning material 7 made of a foamed resin sheet laminated on one side of the substrate 3, and a sheet-shaped sealant layer 9 further laminated on one side of the cushioning material 7. In the present embodiment, the substrate 3 and the cushioning material 7 are made of different resins. A sheet-shaped adhesive layer 5 is disposed between the substrate 3 and the cushioning material 7 so as to adhere the substrate 3 and the cushioning material 7. A surface of the laminate 10 on the substrate 3 side may be embossed. The foamed resin sheet that constitutes the cushioning material 7 may be either a crosslinked foamed resin sheet or a non-crosslinked foamed resin sheet.

A material of the substrate 3 may be, for example, polyethylene terephthalate (PET), biaxially stretched polypropylene (OPP), or the like. The cushioning material 7 may be, for example, a foamed resin sheet made of polyethylene (PE), polypropylene (PP), or the like. An expansion ratio of the foamed resin sheet is in the range of 5 to 50 times, preferably 18 to 50 times, and more preferably 18 to 32 times. When the expansion ratio of the foamed resin sheet is in the range of 18 to 50 times, packaging bags having high openability, sealability and flexibility can be obtained. When the expansion ratio of the foamed resin sheet is in the range of 18 to 32 times, packaging bags having high puncture strength and processability as well as the openability and the like can be obtained. The expansion ratio is expressed as a value of the density of resin before foaming/the density of resin after foaming.

A material for the sealant layer 9 may be, for example, linear low density polyethylene (LLDPE), high density polyethylene (HDPE) or the like. The adhesive layer 5 may be made of a material such as PE. The sealant layer 9 is an inner surface of the packaging bag 1, which is a layer that is in contact with the contents. Accordingly, LLDPE is desirably used as a material for the sealant layer 9 in view of slipperiness.

The sealant layer 9 may be uncolored, or may be a colored sealant layer. As the colored sealant layer, for example, LLDPE containing 1 to 10 wt. % of colored pigment may be used. Table 1 shows the result of evaluation for concealability and sealing strength. The evaluation was performed by varying the coloring pigment added to the sealant layer ranging from 0 wt. % to 12 wt. %. The concealability was evaluated as follows: A. The packaging bag had concealability sufficient to conceal the contents so as not to be recognized from the outside; B. The packaging bag had both concealability and visibility; and C. The packaging bag had no concealability. Furthermore, the sealing strength was evaluated as follows: A. The packaging bag had sealing strength of a degree similar to the case where a colored pigment is not added; B. The packaging bag had sealing strength sufficient for a general packaging bag; and C. The packaging bag had reduced sealing strength.

TABLE 1

| | Amount of pigment added [wt. %] | | | | | | |
|---|---|---|---|---|---|---|---|
| | 0% | 1% | 3% | 5% | 7% | 10% | 12% |
| Concealability | C | B | A | A | A | A | A |
| Sealing Strength | A | A | A | A | B | B | C |

As shown in Table 1, when the amount of colored pigment added was 3 wt. % or more, sufficient concealability was obtained solely by the sealant layer. Furthermore, when the amount of colored pigment added was 5 wt. % or less, sealing strength of a degree similar to the case where no colored pigment was added was obtained. Thus, by adjusting the amount of colored pigment added at the range from 3 to 5 wt. %, sealing strength similar to that of an uncolored sealant layer and sufficient concealability can be obtained. The colored pigment may be, for example, carbon black or gray. However, other pigments than these can also be used.

Although the thicknesses of the respective layers in the laminate 10 are not specifically limited, the thickness of the laminate 10 can be reduced over the conventional one so that the volume ratio of the capacity to the outer volume of the packaging bag 1 can be improved. In the present embodiment, for example, the substrate 3 has a thickness in the range of 6 to 40 μm, the adhesive layer 5 has a thickness in the range of 15 to 30 μm, the cushioning material 7 has a thickness in the range of 1 to 5 mm, and the sealant layer 9 has a thickness in the range of 15 to 80 μm.

The above laminate 10 is produced, for example, by a method described below. First, the adhesive layer 5 is laminated on one surface of the sheet-shaped substrate 3 by extruder processing. Subsequently, the sheet-shaped cushioning material 7 is laminated by thermal lamination on the adhesive layer 5 which has been laminated on the substrate 3. Further, the sheet-shaped sealant layer 9 is laminated by thermal lamination as well on the cushioning material 7 which has been laminated on the adhesive layer 5. Thus, the laminate 10 having the substrate 3, the adhesive layer 5, the cushioning material 7, and the sealant layer 9, which are laminated in sequence is formed. In this production process, predetermined print may be applied on the entirety or part of one surface (rear surface) of the substrate 3 as a pre-stage of the extruder processing. The print is prevented from being faded by being printed on the rear surface of the substrate 3. Further, the print can impart concealability to the packaging bag 1 so that the contents cannot be recognized from the outside. Any color can be used for printing for improving concealability of the packaging bag 1 as long as it contributes to concealing the contents. For example, printing in a color close to that of kraft paper such as sepia on the substrate 3 improves concealability while causing little visual difference from the packaging bags conventionally used.

Figure 2:
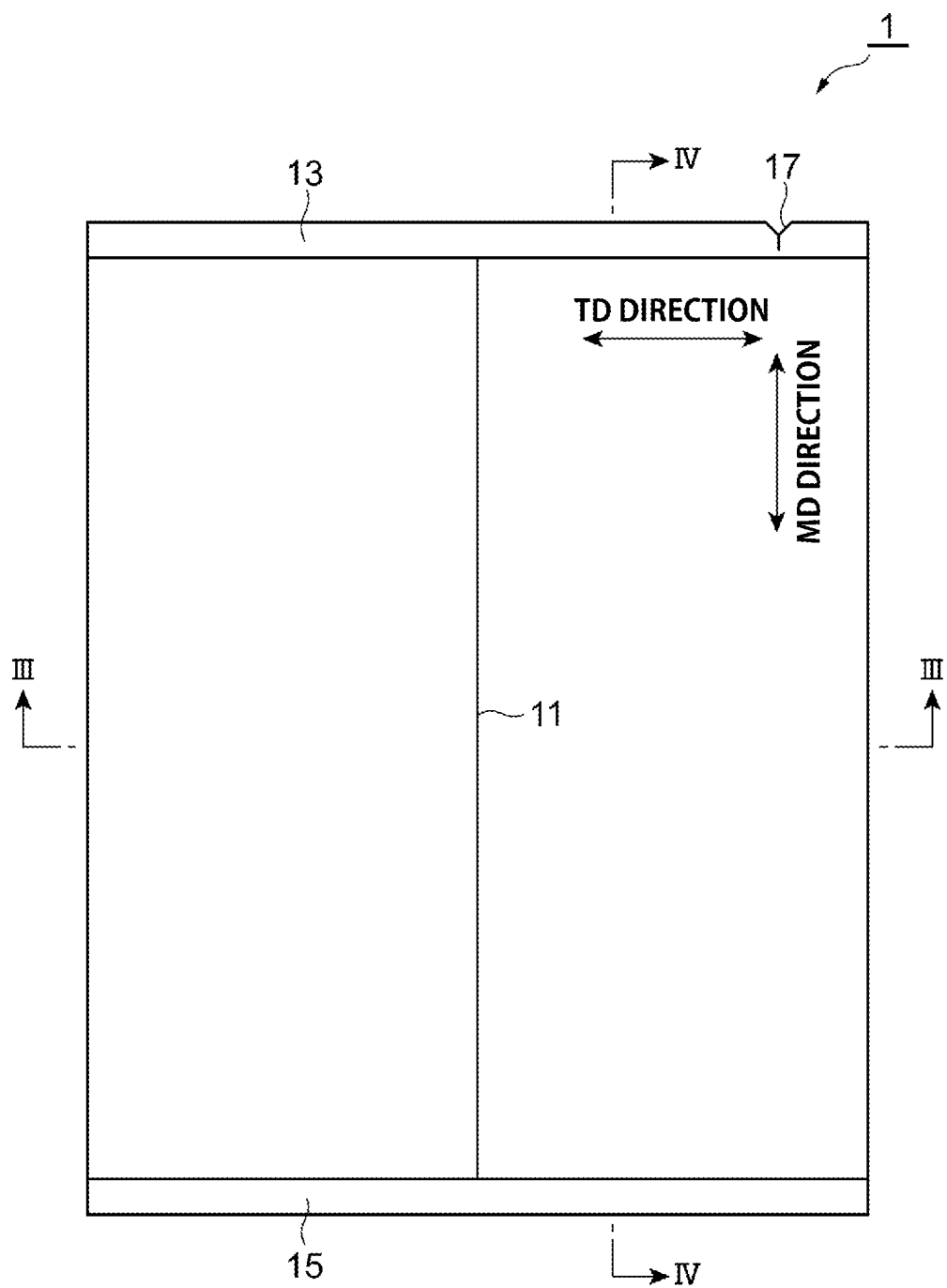
FIG. 2 is a plan view of a packaging bag according to a first embodiment of the present invention.
Figure 3:
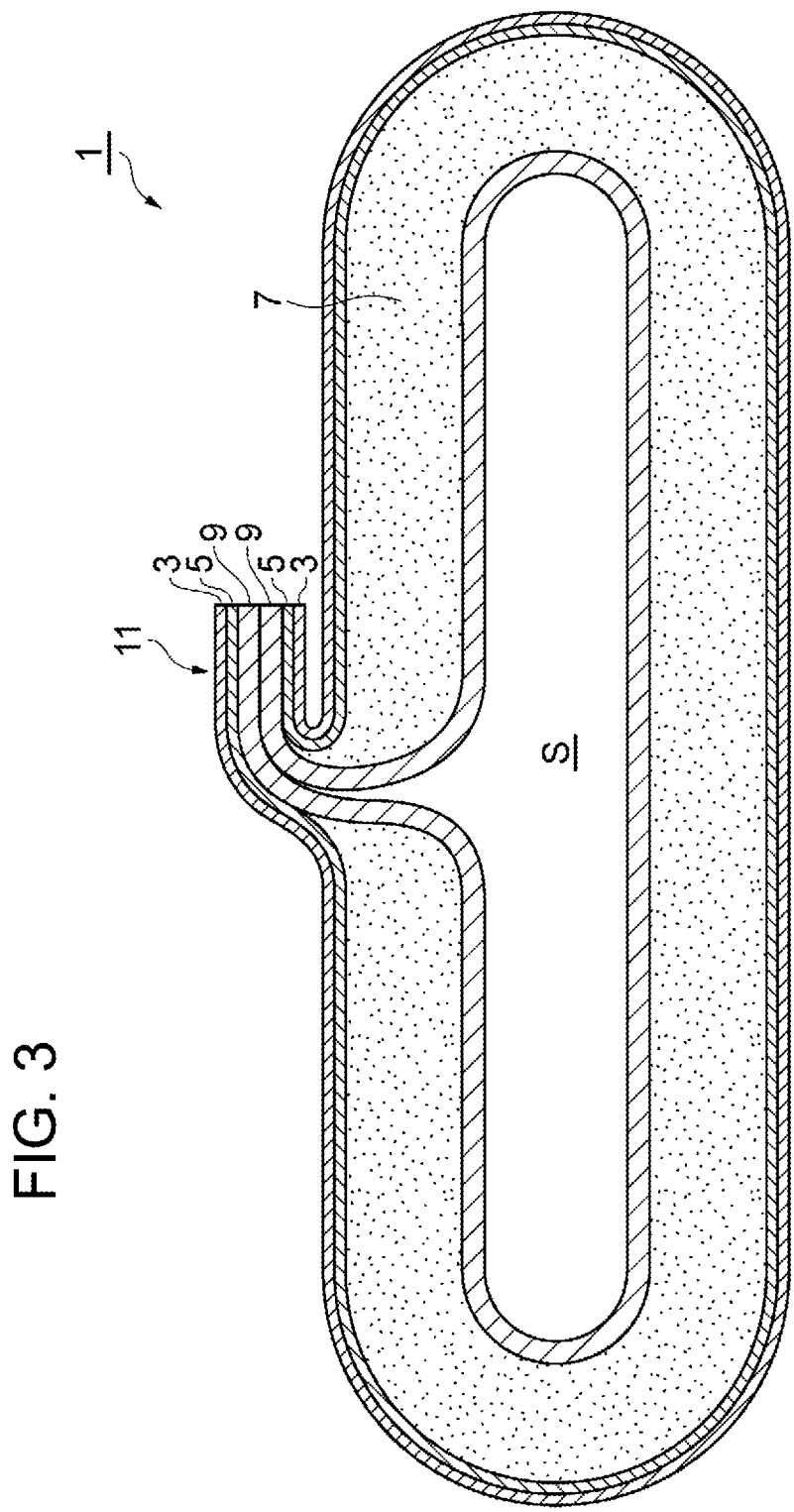
FIG. 3 is a cross-sectional view of the packaging bag shown in FIG. 2 taken along the line thereof.
Figure 4:
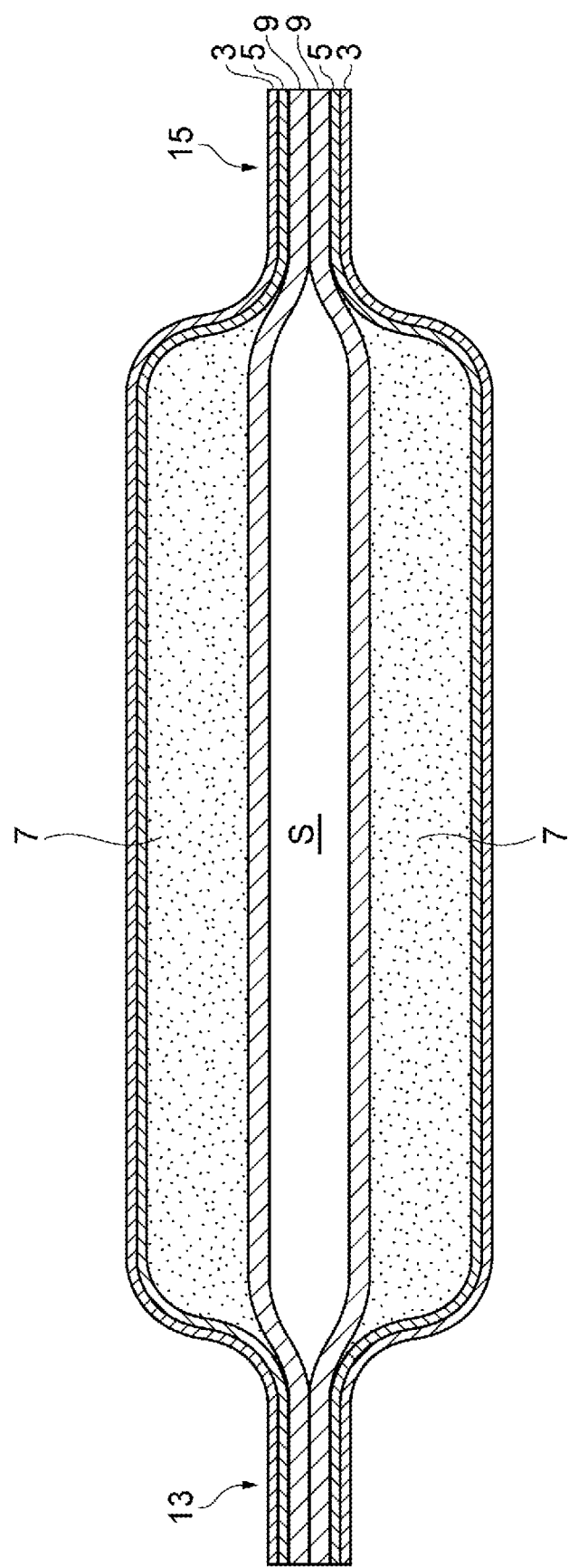
FIG. 4 is a cross-sectional view of the packaging bag shown in FIG. 2 taken along the line IV-IV thereof.

FIG. 2 is a plan view of the packaging bag 1 formed of the laminate 10. FIG. 3 is a cross-sectional view of the packaging bag 1 in a width direction, and FIG. 4 is a cross-sectional view of the packaging bag 1 in a longitudinal direction. As shown in FIG. 2, the packaging bag 1 is a bag body formed of the laminate 10 in a pillow shape (bag shape) with the sealant layer 9 facing inward (the substrate 3 facing outward). The packaging bag 1 is in a substantially rectangular shape in plan view. The term "pillow shape" as used herein refers to a shape, as shown in FIGS. 2 and 3, in which a pair of opposing two sides are folded over, and the ends of these folded over portions are sealed to each other. In FIGS. 2 and 3, both end sides of the packaging bag 1 in the width direction are folded over, and the ends of these folded over portions form a seal section 11. In the seal section 11, both ends are thermally sealed to each other in the longitudinal direction at a center of the packaging bag 1 in the width direction. The present embodiment shows the packaging bag 1 in a sealed state. As shown in FIG. 4, both ends of the packaging bag 1 in the longitudinal direction are seals 13 and 15, which are each thermally sealed. Thus, an inner space S is formed in the packaging bag 1.

At the seals 11, 13 and 15 in the laminate 10, the sealant layers 9 are thermally sealed to each other in the state of being laminated facing each other. This packaging is performed by a pillow packaging machine, which uses the laminate 10 in a roll shape to wrap the contents in a continuous manner.

The seal section (first seal section) 13 has a notch (start point of cutting) 17. The notch 17 may be formed at least one position in the seal section 13, but may also be formed at two positions or more in the seal section 13. In the present embodiment, the notch 17 is formed on one end of the seal section 13 in the width direction. As a result, the contents contained in the inner space S are prevented from being damaged when the packaging bag 1 is opened. In the illustrated example, the notch 17 is shown as a Y notch formed in Y-shape. However, the notch 17 is not limited to the Y notch, and may be an I notch or the like.

The foamed resin sheet which forms the cushioning material 7 has an MD direction (machine direction), which is a direction of flow of resin according to production processes. The cushioning material 7 has a characteristic of being easily torn in the MD direction. Since the cushioning material 7 is the thickest layer in the laminate 10, the degree of ease of tear-off of the cushioning material 7 tends to affect the degree of ease of open of the laminate 10 (packaging bag 1). In the present embodiment, the MD direction of the cushioning material 7 corresponds to the longitudinal direction of the packaging bag 1 (see FIG. 2), and the seal section 13 extends in a TD direction (transverse direction), which is a direction perpendicular to the MD direction. The notch 17 provided in the seal section 13 is formed to be oriented to the seal section 15, which is formed at the edge of the other end in the MD direction of the cushioning material 7 in the laminate 10.

As described above, the packaging bag 1 of the present embodiment does not require disassembly for disposal since it is formed of a paper member. In addition to that, the packaging bag 1 has improved water resistance since it is formed of resin. In addition, since the notch 17 is formed to be oriented from one end to the other end in the MD direction of the cushioning material 7, it guides a user to open the bag from the notch 17 in the MD direction, which improves openability. Further, when a surface of the cushioning material 7 is formed of a predetermined rough surface, predetermined irregularities are also formed on an inner surface (sealant layer 9) of the packaging bag 1. As a result, since the contents are less likely to move in the packaging bag 1, the contents can be held in a stable manner.

In the packaging bag 1, the expansion ratio of the foamed resin sheet is 18 to 50 times, and more preferably 18 to 32 times. When the expansion ratio of the foamed resin sheet, which is a cushioning material, is approximately 18 to 50 times, the packaging bag 1 having high openability, sealability and flexibility can be obtained. Further, when the expansion ratio of the foamed resin sheet, which is a cushioning material 7, is approximately 18 to 32 times, the packaging bag 1 having high puncture strength and processability as well as the openability and the like can be obtained.

In the configuration of the packaging bag 1, the sealant layer 9 may contain a colored pigment. In this case, the colored pigment contained in the sealant layer 9 may be in the range of 1 to 10 wt. %, or alternatively, may be in the range of 3 to 5 wt. %. When the colored pigment contained in the sealant layer 9 is 3 wt. % or more, the contents in the packaging bag 1 is not readily recognized from the outside. Further, when the colored pigment contained in the sealant layer 9 is 5 wt. % or less, sealing strength of a degree similar to that of the uncolored sealant layer 9 can be maintained.

In the configuration of the packaging bag 1, the sealant layer 9 may be substantially made of LLDPE. In this case, the slipperiness of the sealant layer 9 located on the inner surface of the packaging bag 1 can be reduced. Accordingly, when packaging of contents is performed by an automated packaging machine, displacement of contents can be reduced, which facilitates automated packaging.

In the packaging bag 1, the thickness of the cushioning material 7 may be in the range of 1 to 5 mm. In this case, a decrease in the volume ratio of the capacity to the outer volume of the packaging bag 1 can be prevented while the cushioning function of the packaging bag 1 is maintained. Furthermore, in the present embodiment, a decrease in the volume ratio of the capacity to the outer volume of the packaging bag 1 can be readily prevented since the packaging bag 1 is formed in a pillow shape.

Second Embodiment

Figure 5:
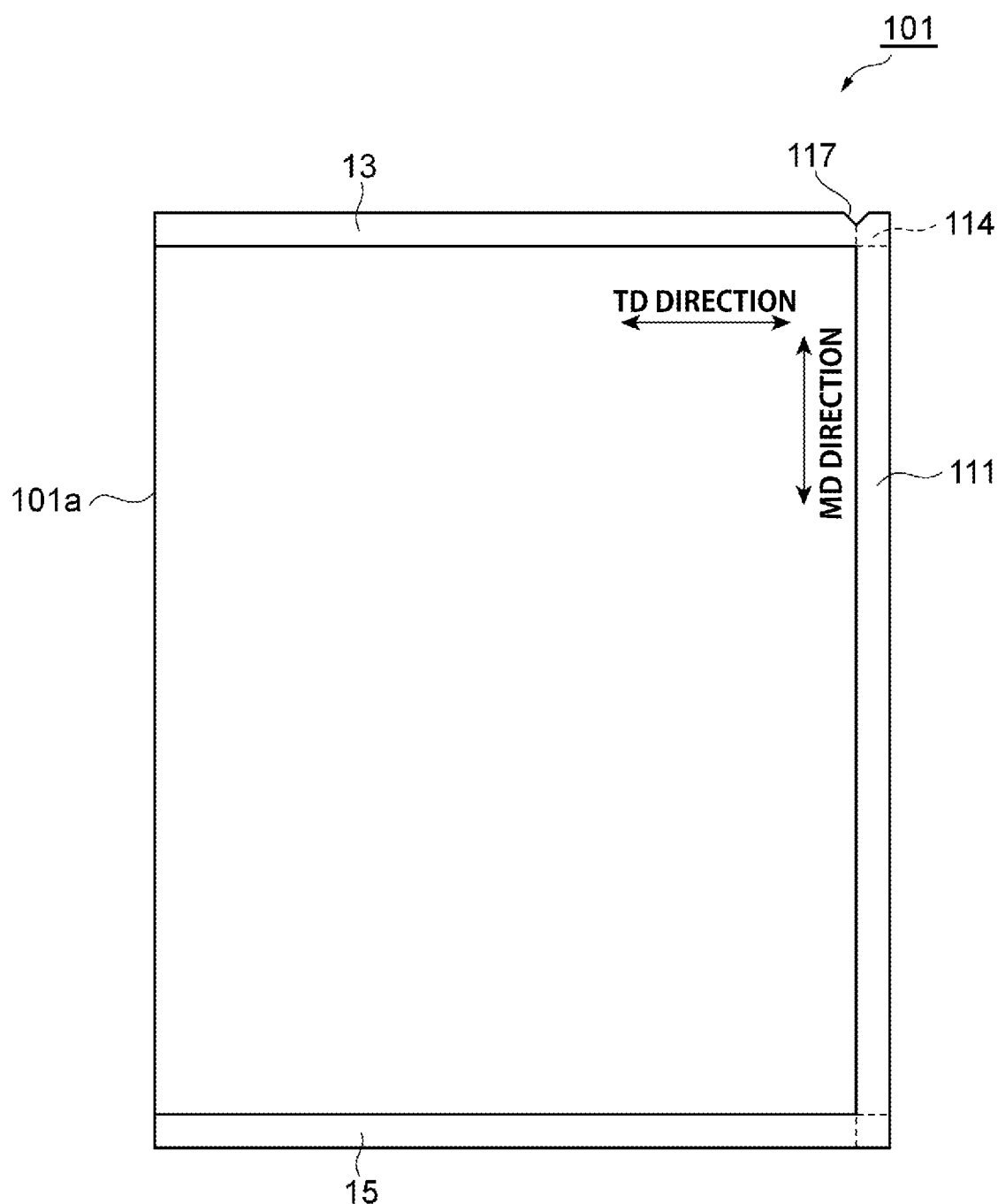
FIG. 5 is a plan view of a packaging bag according to a second embodiment of the present invention.

As shown in FIG. 5, a packaging bag 101 according to a second embodiment differs from the packaging bag 1 of the first embodiment in that a seal section 111 and a notch 117 are provided instead of the seal section 11 and the notch 17, respectively. The following provides a description mainly on the difference from the first embodiment. The elements and components same as those of the first embodiment are referred by the same reference numbers, and detailed description thereof will be omitted.

The packaging bag 101 shown in FIG. 5 is a bag body formed of the laminate 10 (see FIG. 1) with the sealant layer 9 (see FIG. 1) facing inward as with the first embodiment. The packaging bag 101 is in a substantially rectangular shape in plan view. The packaging bag 101 has the seal section 13 on one end in the longitudinal direction and the seal section 15 on the other end in the longitudinal direction. The longitudinal direction of the packaging bag 101 corresponds to the MD direction of the cushioning material 7 in the laminate 10. The seal section (second seal section) 111 is formed on one end (side edge) in the width direction of the packaging bag 101. At the seal section 111, the sealant layers 9 are thermally sealed to each other in the state of being laminated facing each other as with the other seal. The seal section 111 extends on the side edge of the packaging bag 101 from one end to the other end in the longitudinal direction in the MD direction of the cushioning material 7 (see FIG. 1). The seal section 111 overlaps the seal section 13 at one end of the packaging bag 101 in the longitudinal direction. Further, the seal section 111 overlaps the seal section 15 at the other end of the packaging bag 101 in the longitudinal direction. An overlapped portion where the seal section 111 overlaps the seal section 13 and an overlapped portion 114 where the seal section 111 overlaps the seal section 15 each have a substantially rectangular shape in plan view. An end edge 101a on the other end of the packaging bag 101 in the width direction is formed by folding the laminate 10.

The seal section 13 has a notch (start point of cutting) 117 oriented to the seal section 15. The notch 117 is formed at the overlapped portion 114 where the seal section 13 and the seal section 111 overlap each other. In the present embodiment, the notch 117 is formed on the end edge of the substantially rectangular overlapped portion 114 where the seal section 13 and the seal section 111 overlap each other, which is opposite to the end edge of the packaging bag 101 in the width direction. The notch 117 is a Y notch, for example, but is not limited thereto. The notch 117 may be an I notch or the like.

According to the packaging bag 101 described above, the same effects as those of the packaging bag 1 of the first embodiment can be achieved. Moreover, in the packaging bag 101, the seal section 111 in which the laminate 10 is sealed is hardened compared with the other portions which are not sealed since the laminate 10 is made of resin. Since the notch 117 is formed at the overlapped portion 114 where the seal section 13 and the seal section 111 overlap each other, it guides a user to open the bag from the notch 117 in the MD direction along the hardened seal section 111. Accordingly, the hardened seal section 111 serves as a tear tape to thereby facilitate opening along the seal section 111.

Third Embodiment

Figure 6:
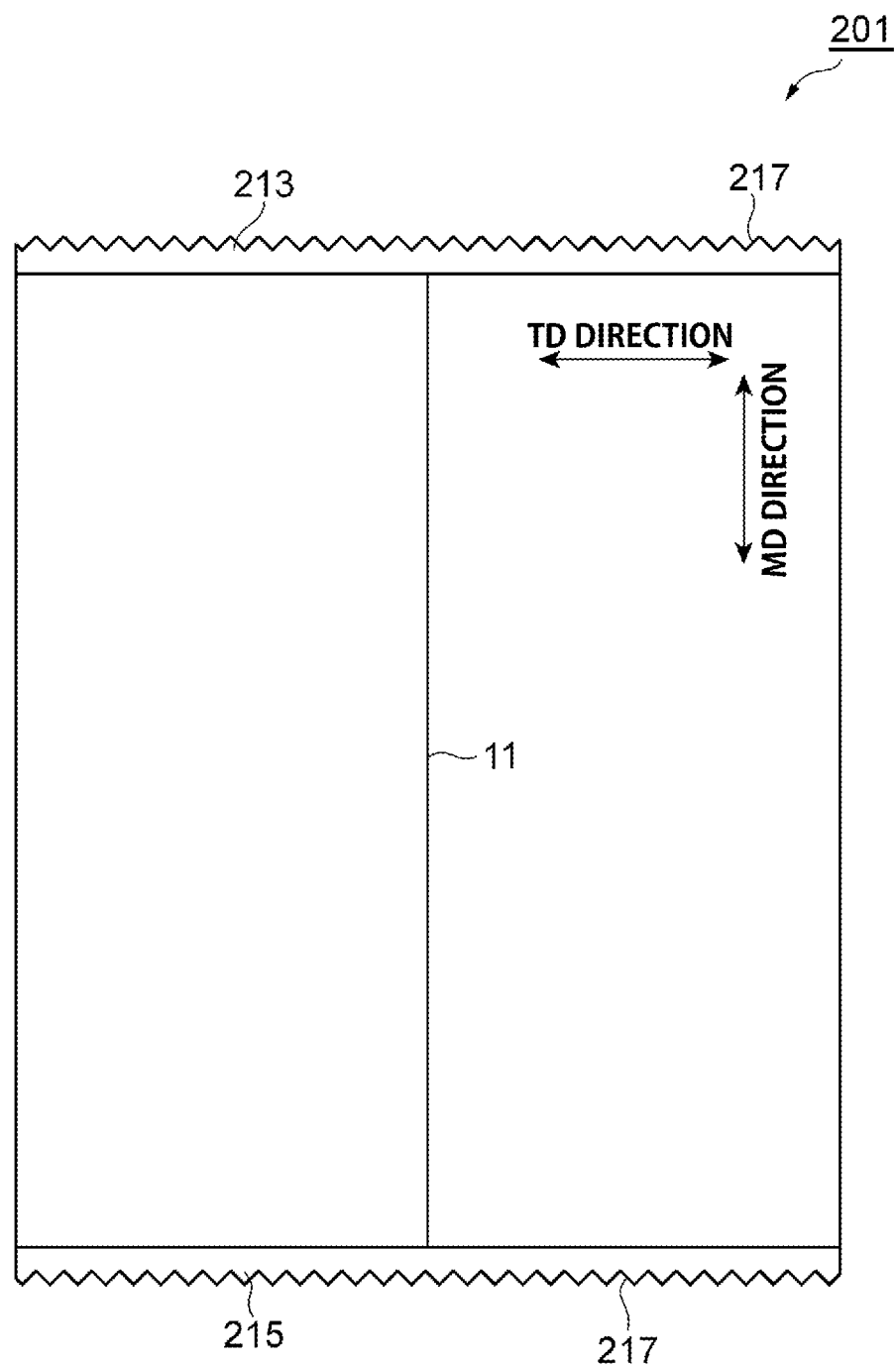
FIG. 6 is a plan view of a packaging bag according to a third embodiment of the present invention.

As shown in FIG. 6, a packaging bag 201 according to a third embodiment differs from the packaging bag 1 of the first embodiment in that a seal section 213, a seal section 215, and a notch 217 were provided instead of the seal section 11, the seal section 13, and the notch 17, respectively. The following provides a description mainly on the difference from the first embodiment. The elements and components same as those of the first embodiment are referred by the same reference numbers, and detailed description thereof will be omitted.

The packaging bag 201 shown in FIG. 6 is a bag body formed of the laminate 10 (see FIG. 1) in a pillow shape with the sealant layer 9 (see FIG. 1) facing inward as with the packaging bag 1 of the first embodiment, and has the seal section 11. The packaging bag 201 has the seal section 213 on one end in the longitudinal direction and the seal section 215 on the other end in the longitudinal direction. The longitudinal direction of the packaging bag 201 corresponds to the MD direction of the cushioning material 7 (see FIG. 1) in the laminate 10.

At the seals 213 and 215, the sealant layers 9 are thermally sealed to each other in the state of being laminated facing each other as with the seal section 11. The seals 213 and 215 each have continuous notches 217. Accordingly, the seals 213 and 215 have a waveform shape. A plurality of notches 217 formed in the seal section 213 and a plurality of notches 217 formed in the seal section 215 are opposed to each other. Although the seals 213 and 215 shown in FIG. 6 have a triangular waveform shape formed by the continuous Y notches, they may also have a waveform shape formed by curves, for example.

According to the packaging bag 201 described above, the same effects as those of the packaging bag 1 of the first embodiment can be achieved. In addition, since a plurality of notches 217 are formed in the packaging bag 201 as shown in the present embodiment, a user can open the packaging bag 201 from a desired position. Moreover, in the present embodiment, the seal section 215 is formed in a waveform shape as with the seal section 213. Accordingly, a user can open the packaging bag 201 from the seal section 215 side as well as the seal section 213 side.

Fourth Embodiment

Figure 7:
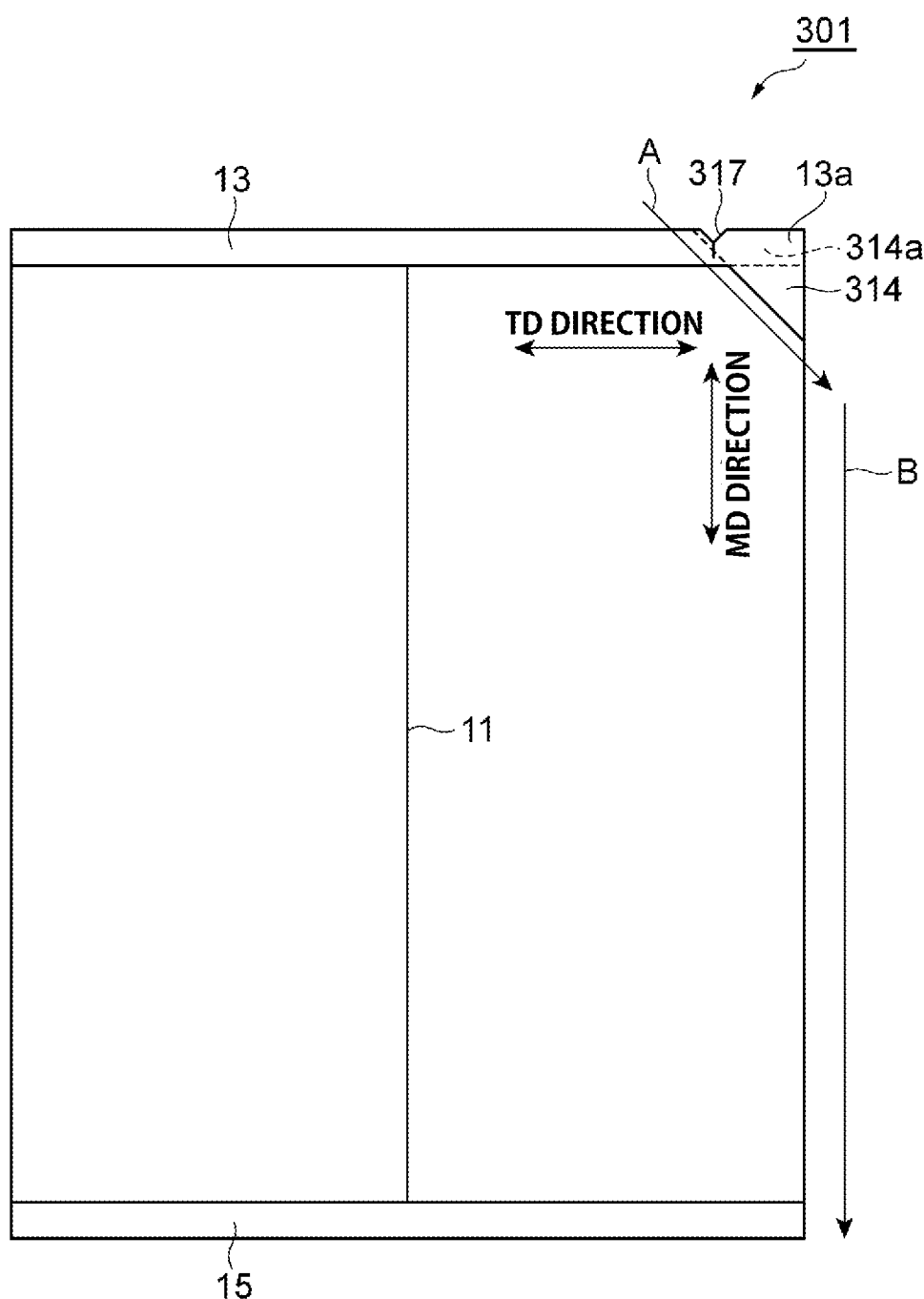
FIG. 7 is a plan view of a packaging bag according to a fourth embodiment of the present invention.

As shown in FIG. 7, a packaging bag 301 according to a fourth embodiment differs from the packaging bag 1 of the first embodiment in that a seal section 314 was further provided and a notch 317 was provided instead of the notch 17. The following provides a description mainly on the difference from the first embodiment. The elements and components same as those of the first embodiment are referred by the same reference numbers, and detailed description thereof will be omitted.

The packaging bag 301 shown in FIG. 7 is a bag body in a pillow shape formed of the laminate 10 (see FIG. 1) with the sealant layer 9 (see FIG. 1) facing inward as with the packaging bag 1 of the first embodiment. The packaging bag 101 is in a substantially rectangular shape in plan view and has the seals 11, 13, and 15. The longitudinal direction of the packaging bag 301 corresponds to the MD direction of the cushioning material 7 (see FIG. 1) in the laminate 10. In the packaging bag 301 of the present embodiment, the seal section (third seal section) 314 is formed. The seal section 314 partially overlaps an end edge 13a in the width direction of the packaging bag 301 in the seal section 13, and extends toward the seal section 15 side. The seal section 314 is formed in a right triangle in plan view. An overlapped portion 314a where the seal section 13 overlaps the seal section 314 have a right-angled trapezoid shape in plan view.

The seal section 13 has a notch (start point of cutting) 317 oriented to the seal section 15. The notch 317 is formed at the overlapped portion 314a where the seal section 13 and the seal section 314 overlap each other. In the present embodiment, the notch 317 is formed on the end edge of the right-angled trapezoid overlapped portion where the seal section 13 and the seal section 314 overlap each other, which is opposite to the end edge of the packaging bag 301 in the width direction. The notch 317 is a Y notch, for example, but is not limited thereto. The notch 117 may be an I notch or the like.

According to the packaging bag 301 described above, the same effects as those of the packaging bag 1 of the first embodiment can be achieved. In addition, when the notch 317 is formed at the overlapped portion 314a where the seal section 13 and the seal section 314 overlap each other as shown in the present embodiment, it guides a user to pinch the seal section 314 for opening the bag. For example, a user can first pinch the seal section 314 and pull it in an obliquely outward direction (direction indicated by the arrow A in FIG. 7) for opening the bag, and then open the bag in a direction toward the seal section 15 (direction indicated by the arrow B in FIG. 7) with ease by hand. The seal section 314 extends from the seal section 13 toward the seal section 15 side, and has a width partially larger than the seal section 13. Accordingly, a user can pinch the seal section 314 with ease, which contributes to improvement in openability.

While the embodiments of the present invention were described in detail with reference to the drawings, specific configurations are not limited to these embodiments. For example, in the aforementioned example, the seal section 13 was formed on one end edge in the MD direction of the cushioning material 7 in the laminate 10 so as to extend in the direction perpendicular to the MD direction. However, in this case, the direction perpendicular to the MD direction should be construed as including not only being exactly at a right angle but also being angled at approximately ±10 degrees.

Further, configurations of the aforementioned embodiments may be partially combined or replaced. For example, the seals 13 and 15 of the packaging bag 101 in the second embodiment may be replaced with the seals 213 and 215 of the third embodiment, respectively.

EXAMPLES

The above embodiments will be further described with reference to examples and comparative examples. However, the above embodiments are not limited to what is described in the examples. Further, the packaging bags according to Examples 1 to 8 below have the shape of the packaging bag 1 of the first embodiment.

Example 1

A 12 μm-thick PET sheet was provided as a substrate, and a 15 μm-thick PE layer (adhesive layer) was laminated thereon by extruder processing. Subsequently, a foam PE sheet (cushioning material) with a thickness of 1.5 mm was laminated on the PE layer by thermal lamination. Then, an LLDPE sheet (sealant layer) with a thickness of 30 μm was laminated by thermal lamination on the laminated foam PE sheet. Then, embossing of grid pattern with an interval of 5 mm was applied on a surface of the substrate to thereby obtain a laminate. The expansion ratio of the foam PE sheet which constitutes the laminate was 10 times. This laminate was formed into a pillow shape with a long side of 340 mm, a short side of 240 mm, and a thickness of 30 mm, with the LLDPE sheet facing inward. While the contents were accommodated, both ends in the longitudinal direction were thermally sealed and a notch was formed in one of the seals. Thus, a packaging bag of Example 1 was obtained. Further, the longitudinal direction of the packaging bag corresponded to the MD direction of the cushioning material.

Example 2

A packaging bag of Example 2 differs from the packaging bag of Example 1 in that a foam PE sheet having an expansion ratio of 20 times was used as a cushioning material. That is, the packaging bag of Example 2 was formed of a 12 μm-thick PET sheet, a 15 μm-thick PE layer, a 1.5 mm-thick foam PE sheet having an expansion ratio of 20 times, and a 30 μm-thick LLDPE sheet, which were laminated in sequence.

Example 3

A packaging bag of Example 3 differs from the packaging bag of Example 1 in that a foam PE sheet having an expansion ratio of 30 times was used as a cushioning material. That is, the packaging bag of Example 3 was formed of a 12 μm-thick PET sheet, a 15 μm-thick PE layer, a 1.5 mm-thick foam PE sheet having an expansion ratio of 30 times, and a 30 μm-thick LLDPE sheet, which were laminated in sequence.

Example 4

A packaging bag of Example 4 differs from the packaging bag of Example 1 in that a foam PE sheet having an expansion ratio of 40 times was used as a cushioning material. That is, the packaging bag of Example 4 was formed of a 12 μm-thick PET sheet, a 15 μm-thick PE layer, a 1.5 mm-thick foam PE sheet having an expansion ratio of 40 times, and a 30 μm-thick LLDPE sheet, which are laminated in sequence.

Example 5

A packaging bag of Example 5 differs from the packaging bag of Example 1 in that a foam PE sheet having an expansion ratio of 50 times was used as a cushioning material. That is, the packaging bag of Example 5 was formed of a 12 μm-thick PET sheet, a 15 μm-thick PE layer, a 1.5 mm-thick foam PE sheet having an expansion ratio of 50 times, and a 30 μm-thick LLDPE sheet, which were laminated in sequence.

Example 6

A packaging bag of Example 6 differs from the packaging bag of Example 3 in that irregularities were formed on the LLDPE sheet which is the sealant layer to thereby increase a friction coefficient. That is, in the packaging bag of Example 6, a static friction coefficient of an inner layer of the packaging bag was 0.26 and a kinetic friction coefficient was 0.25. Furthermore, the packaging bag was formed of a 12 μm-thick PET sheet, a 15 μm-thick PE layer, a 1.5 mm-thick foam PE sheet having an expansion ratio of 30 times, and a 30 μm-thick LLDPE sheet, which were laminated in sequence. In addition, in the packaging bag of Example 3, a static friction coefficient of an inner layer of the packaging bag was 0.19 and a kinetic friction coefficient was 0.18 (see Table 3).

Example 7

A packaging bag of Example 7 differs from the packaging bag of Example 3 in that irregularities were formed on the LLDPE sheet, which was the sealant layer, to thereby increase a friction coefficient. That is, in the packaging bag of Example 7, a static friction coefficient of an inner layer of the packaging bag was 0.33 and a kinetic friction coefficient was 0.32. Furthermore, the packaging bag was formed of a 12 μm-thick PET sheet, a 15 μm-thick PE layer, a 1.5 mm-thick foam PE sheet having an expansion ratio of 30 times, and a 30 μm-thick LLDPE sheet, which were laminated in sequence. Further, the sheet having irregularities shown in Examples 6 and 7 may be provided by obtaining a sheet having irregularities to ensure a predetermined friction coefficient, or a flat sheet to which irregularities are formed by a known technique.

Example 8

A packaging bag of Example 8 differs from the packaging bag of Example 3 in that the sealant layer was a HDPE sheet. The HDPE sheet had a thickness of 30 μm. That is, the packaging bag of Example 8 was formed of a 12 μm-thick PET sheet, a 15 μm-thick PE layer, a 1.5 mm-thick foam PE sheet having an expansion ratio of 30 times, and a 30 μm-thick HDPE sheet, which were laminated in sequence. Since the inner layer of the packaging bag was formed of a HDPE sheet, a static friction coefficient of the inner layer was 0.14 and a kinetic friction coefficient was 0.11.

Comparative Example 1

In the packaging bag of Comparative Example 1, a foam cushioning material made of PE was disposed inside, and the outside of the packaging bag was made of kraft paper. The foam cushioning material and kraft paper were bonded to each other by an adhesive. In this packaging bag, a seal strip was provided on one long side, and an adhesive tape was adhered to the seal strip.

Comparative Example 2

A packaging bag of Comparative Example 2 differs from the packaging bag of Example 2 in that the longitudinal direction of the packaging bag corresponded to the TD direction of the foam PE sheet. That is, according to the packaging bag of Comparative Example 2, an opening direction by a notch corresponded to the TD direction of the foam PE sheet rather than the MD direction.

For Examples 1 to 5 and Comparative Example 1, a vibration test, compression test, water resistance test, moisture resistance test, heat resistance test, and impact resistance test were performed as tests for evaluating basic performances practically required for packaging bags.

The vibration test is a test to check whether a packaging bag and the contents inside are not damaged by vibration when the packaging bag containing the contents is transported. The test was performed under the condition that samples (packaging bags according to Examples and Comparative Example 1) were horizontally stacked in a cardboard box and transported 2000 km or more by land transportation by using a transport vehicle (compliant to JIS Z 0200). The number of samples was 3.

A compression test is a test to check whether a packaging bag and the contents inside are not damaged when a constant pressure is applied to the packaging bag containing the contents. The test was performed by compressing the horizontally stacked samples from above by using a stainless plate of 10 cm diameter, and by compressing the entire surface of the horizontally stacked samples from above (compliant to JIS Z 0212). The rate of compression was 10 mm/min.

A water resistance test is a test to check water permeation into the packaging bag and defects in appearance of the contents. The test was performed by immersing the sample into water with a surface of the sample vertically oriented. The contents were a paper magazine, and the immersion time was 5 minutes. The number of samples was 2.

A moisture resistance test is a test to check water permeation into the packaging bag and defects in appearance of the contents. The test was performed by storing the sample under high temperature and high humidity conditions. The contents were a paper magazine, the temperature was 40° C., the relative humidity was 90%, and the storage period was 4 days. The number of samples was 3.

A heat resistance test is a test to check adhesion of the inner surfaces (sealant layers) of the packaging bag and adhesion of the inner surface to the contents. The test was performed by storing the sample under high temperature conditions. The contents were a compact disk (CD) stored in a plastic case, and the temperature was set at 80° C., 60° C., and 50° C. Further, the storage period was 24 hours, and observation was performed when 5 minutes, 10 minutes, 20 minutes, 30 minutes, 1 hour, 3 hours, 6 hours, and 24 hours elapsed after the start of test. The number of samples was 3.

An impact resistance test was a test to check whether a packaging bag and the contents inside are not damaged when a certain impact is applied to the packaging bag containing the contents. The test was performed by dropping an object from right above the sample horizontally stacked. The contents were a compact disk (CD) stored in a plastic case, and the dropped object was a cardboard case containing PET bottles (six bottles of 2L water). The drop height was 60 cm, and the number of tests was five. The number of samples was 3.

In Examples 1 to 5, there was no practical problem for all the tests performed. On the other hand, in Comparative Example 1, there was no practical problem for the vibration test, compression test, moisture resistance test and impact resistance test, while water infiltration into the inside was found in the water resistance test, which may lead to a practical risk. Further, the results of the moisture resistance test in Examples 1 to 5 were good compared with the results in Comparative Example 1.

Further, in Examples 1 to 8 and Comparative Example 2, the openability, sealability, puncture strength, processability, and flexibility were evaluated as performance evaluation for packaging bag. Table 2 shows the results of these evaluation.

The evaluation of openability was performed by a sensory test which evaluated whether the packaging bag can be opened by hand without using a tool. An attempt was made to open the packaging bag from the notch formed in the packaging bag as a start point of opening, and evaluated as follows: A. The packaging bag was easily opened; B. The packaging bag was opened without problem although it was not easily opened; and C. The packaging bag failed to open. The number of samples was 3.

The evaluation of sealability was performed on the basis of sealing strength (compliant with JIS Z 1707) of a test piece obtained by cutting the seal section of the packaging bag by a width of 15 mm. The sealability was evaluated as follows: A. The sealing strength was in the range of 15 to 25N, which was rated as being most preferred; and B. The sealing strength was in the range of 10 to 14N, which was rated as having no practical problem. The number of samples was 3.

The evaluation of puncture strength was performed on the basis of the puncture strength (compliant with JIS Z 1707) of the laminate that forms the packaging bag. The puncture strength was evaluated as follows: A. The puncture strength was 6N or more, which was rated as being most preferred; and B. The puncture strength was 4N or more, which was rated as having no practical problem. The number of samples was 3.

The evaluation of processability was comprehensively determined according to whether the laminate was easily folded (that is, the flexibility evaluated as: A. The laminate was easily folded; and B. Folding of the laminate was possible without practical problem), and whether abrasion of a cutting blade was less likely to occur during slit processing. The processability was evaluated as follows: A. The laminate was easily folded and abrasion of the cutting blade was less likely to occur; and B. No practical problem found, but either of the above evaluations was low.

As the results of evaluation, a practical problem was not found in Examples 1 to 8. In particular, in Examples 2, 3, and 6 to 8, all the items were evaluated as "A," which was the highest evaluation. On the other hand, in Comparative Example 2, which differs from Example 2 in the opening direction, the openability was evaluated as "C," which showed that use of the packaging bag was difficult when attempting to open the packaging bag by hand without using a tool. In Example 1, the laminate is harder than those of the other Examples since the cushioning material has a low expansion ratio. Accordingly, the flexibility was evaluated as "B." In Example 1, openability, sealability, and processability, which are evaluation items for flexibility, were evaluated as "B." In Examples 4 and 5 having high expansion ratio, although the flexibility was excellent, the strength was low. Accordingly, the puncture strength was evaluated as "B." In Examples 4 and 5, although folding was easy, abrasion of the cutting blade was likely to occur. Accordingly, the processability was evaluated as "B." Thus, in the packaging bag of

TABLE 2

| Sample | Opening direction | Expansion ratio | Openability | Sealing Strength | Sealability | Puncture strength | Processability | Flexibility |
|---|---|---|---|---|---|---|---|---|
| Example 1 | MD | 10 times | B | 11N | B | A | B | B |
| Example 2 | MD | 20 times | A | 17N | A | A | A | A |
| Example 3 | MD | 30 times | A | 21N | A | A | A | A |
| Example 4 | MD | 40 times | A | 18N | A | B | B | A |
| Example 5 | MD | 50 times | A | 15N | A | B | B | A |
| Example 6 | MD | 30 times | A | 21N | A | A | A | A |
| Example 7 | MD | 30 times | A | 21N | A | A | A | A |
| Example 8 | MD | 30 times | A | 21N | A | A | A | A |
| Comparative Example 2 | TD | 20 times | C | 17N | A | A | A | A |

Examples, it was found that the expansion ratio in the range of 18 to 50 times ensured high openability, sealability and flexibility, while the expansion ratio in the range of 18 to 32 times ensured high puncture strength and processability as well as openability and the like.

Then, the packaging bags of Examples 3, and 6 to 8 were evaluated for auto-loading properties, by which whether the contents are loaded in position without deviation was evaluated when packaging of the contents was automated using the packaging bag of Examples. The contents to be contained were a book having a paper front cover and a CD stored in a case whose surface was made of plastic. The auto-loading properties were evaluated as follows: A. The contents were loaded in position without deviation during automated loading and no displacement was found after a transport test; B. The contents were loaded in position without deviation during automated loading, but displacement of a degree that is not significant for practical use was found after a transport test; and C. The contents were slightly slipped during automated loading. The results are shown in Table 3. Further, Table 3 also shows a static friction coefficient and a kinetic friction coefficient of an innermost surface (sealant layer) of the packaging bag of each of Examples.

TABLE 3

| Sample | Auto-loading properties | Static friction coefficient | Kinetic friction coefficient |
| --- | --- | --- | --- |
| Example 3 | B | 0.19 | 0.18 |
| Example 6 | A | 0.26 | 0.25 |
| Example 7 | A | 0.33 | 0.32 |
| Example 8 | C | 0.14 | 0.11 |

As shown in Table 3, in the packaging bag of Examples 6 and 7, the contents were loaded in position without deviation during automated loading and no displacement was found after a transport test since the sealant layer of the innermost layer was made of LLDPE and irregularities were formed on the surface to thereby increase a friction coefficient. Accordingly, the auto-loading properties were evaluated as "A." In the packaging bag of Example 3, the contents were loaded in position without deviation during automated loading but a problem that is not practically significant was found, since the sealant layer of the innermost layer was made of LLDPE which is not slippery although irregularities were not formed on the sealant layer. Accordingly, the auto-loading properties were evaluated as "B." Further, in the packaging bag of Example 8, the innermost layer was HDPE, which is slightly slippery. Accordingly, although the auto-loading properties were evaluated as "C," automated loading was possible.

As for the auto-loading properties described above, the innermost layer (sealant layer) of the packaging bag was also evaluated from a view point of static friction coefficient and kinetic friction coefficient. For example, as shown in Examples 3, 6, and 7, a static friction coefficient and kinetic friction coefficient in the range of 0.18 to 0.5 is preferred in view of auto-loading properties. Furthermore, as shown in Examples 6 and 7, a static friction coefficient and kinetic friction coefficient in the range of 0.25 to 0.35 is more preferred in view of auto-loading properties. In addition, the static friction coefficient and the kinetic friction coefficient can be calculated based on JIS K7125.

Next, for openability of the packaging bag according to the Examples, the packaging bags of Example 3 and 9 were evaluated.

Example 9

A packaging bag of Example 9 differs from the packaging bag of Example 3 in that the sealant layer was a colored LLDPE sheet with 30 μm thickness. That is, the packaging bag of Example 9 was formed of a 12 μm-thick PET sheet, a 15 μm-thick PE layer, a 1.5 mm-thick foam PE sheet having an expansion ratio of 30 times, and a 30 μm-thick LLDPE sheet, which were laminated in sequence. Further, the packaging bag of Example 9 had no practical problem for the vibration test, compression test, water resistance test, moisture resistance test, heat resistance test, and impact resistance test.

As the evaluation of openability of the packaging bag, the tear strength was measured for Examples 3 and 9. As described above, Example 9 differs from Example 3 in that the sealant layer was a colored LLDPE sheet with 30 μm thickness. The tear strength was compliant with the JIS K7128-A trouser tear test. A 75 mm notch was formed in the laminate having 50 mm width and 150 mm length at a center in the width direction, and the tear strength in the length direction was measured with test speed of 200 mm/min. The laminate that constitutes the packaging bag of Example 3 had the tear strength of 10.5 N, and the laminate that constitutes the packaging bag of Example 9 had the tear strength of 4.2 N. Thus, it was found that Example 2 in which a colored sealant layer was used had improved openability compared with Example 1.

INDUSTRIAL APPLICABILITY

The present invention is applicable to packaging bags that accommodate contents.

REFERENCE SIGNS LIST 1, 101, 201, 301 . . . Packaging bag, 3 . . . Substrate, 5 . . . Adhesive layer, 7 . . . Cushioning material, 9 . . . Sealant layer, 10 . . . Laminate, 13, 213 . . . First seal section, 17, 117, 217, 317 . . . Notch (Start point of cutting), 111 . . . Second seal section, 314 . . . Third seal section.

What is claimed is:
1. A packaging bag, comprising:
a laminate having a rectangular shape in plan view,
the laminate being composed of a sheet-shaped substrate made of a resin, a cushioning material made of a foamed resin sheet laminated on an inner side relative to the substrate, and a sealant layer laminated on an inner side relative to the cushioning material, the laminate includes in a first direction, which is a direction perpendicular to a flow direction of the foamed resin, a first edge and a second edge, which is opposite to the first edge in the first direction, the sealant layer comprises in the first direction a first edge at the first edge of the laminate, a second edge at the second edge of the laminate and a non-edge portion between the first edge and the second edge of the sealant layer in the first direction;
the laminate is folded so that the non-edge portion of the sealant layer faces an inner space of the packaging bag and so that the first edge and the second edge of the laminate form a first seal section extending in the flow direction of the foamed resin sheet, the first seal section is at a center of the packaging bag in the first direction;
wherein in the first seal section, the first edge and the second edge of the sealant layer are abutted to each other and thermally sealed to each other in the flow direction, wherein the sealant layer further comprises a third edge, which is perpendicular to the first edge and the second edge, the third edge comprises a first edge portion and a second edge portion, which are sealed to each other to form a second seal portion of the laminate, the second seal portion being perpendicular to the first seal portion;

wherein the second seal section comprises a Y notch oriented in the flow direction of the foamed resin sheet and wherein an expansion ratio of the foamed resin sheet is in a range of 18 to 32 times.

2. The packaging bag of claim 1, wherein the sealant layer includes a colored pigment.

3. The packaging bag of claim 2, wherein the sealant layer includes 1 to 10 wt. % of the colored pigment.

4. The packaging bag of claim 1, wherein the sealant layer is substantially made of LLDPE.

5. The packaging bag of claim 1, wherein the cushioning material has a thickness in a range of 1 to 5 mm.

6. The packaging material of claim 5, wherein the cushioning material is a foam polyethylene or a foam polypropylene.

* * * * *